United States Patent
Makita et al.

(10) Patent No.: US 10,486,235 B2
(45) Date of Patent: Nov. 26, 2019

(54) METHOD FOR PRODUCING SILVER PARTICLES, AND SILVER PARTICLES PRODUCED BY THE METHOD

(71) Applicant: TANAKA KIKINZOKU KOGYO K.K., Chiyoda-ku, Tokyo (JP)

(72) Inventors: Yuichi Makita, Ibaraki (JP); Yuusuke Ohshima, Ibaraki (JP); Hidekazu Matsuda, Ibaraki (JP); Junichi Taniuchi, Ibaraki (JP); Noriaki Nakamura, Ibaraki (JP); Hitoshi Kubo, Ibaraki (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 239 days.

(21) Appl. No.: 15/101,859

(22) PCT Filed: Dec. 11, 2014

(86) PCT No.: PCT/JP2014/082822
§ 371 (c)(1),
(2) Date: Jun. 3, 2016

(87) PCT Pub. No.: WO2015/087967
PCT Pub. Date: Jun. 18, 2015

(65) Prior Publication Data
US 2016/0303659 A1    Oct. 20, 2016

(30) Foreign Application Priority Data

Dec. 11, 2013    (JP) .................................. 2013-256182

(51) Int. Cl.
*B22F 9/30*    (2006.01)
*B82Y 40/00*    (2011.01)
(Continued)

(52) U.S. Cl.
CPC .............. *B22F 9/30* (2013.01); *B22F 1/0003* (2013.01); *B82Y 30/00* (2013.01); *B82Y 40/00* (2013.01);
(Continued)

(58) Field of Classification Search
CPC ...... B23K 1/008; B23K 1/19; B23K 2103/10; B23K 35/002; B23K 35/284;
(Continued)

(56) References Cited

U.S. PATENT DOCUMENTS

2012/0043510 A1    2/2012    Kurihara et al.
2015/0001452 A1*   1/2015    Kurihara ................ C09D 11/52
                                                                252/514
(Continued)

FOREIGN PATENT DOCUMENTS

JP    2008-214695 A        9/2008
JP    2008214695 A  *      9/2008
(Continued)

OTHER PUBLICATIONS

PCT, International Preliminary Report on Patentability for PCT/JP2014/082822, dated Jan. 15, 2015.

*Primary Examiner* — Jenny R Wu
(74) *Attorney, Agent, or Firm* — Orrick, Herrington & Sutcliffe LLP; Joseph A. Calvaruso; K. Patrick Herman (57) ABSTRACT

The present invention provides a method for producing silver particles, including the steps of: mixing a thermally decomposable silver compound and an amine compound to prepare a silver-amine complex as a precursor; and heating the silver-amine complex at a heating temperature equal to or higher than the decomposition temperature of the silver-amine complex to precipitate silver particles, the silver compound being silver carbonate, the amine compound being terminated with a primary amino group on at least one
(Continued)

end and containing a predetermined hydrocarbon group R with a carbon number of 4 to 10. In the method of the present invention, silver particles with the particle size controlled to fall within the range of 20 nm to 200 nm in terms of an average particle size can be produced.

$H_2N—R$ [Chemical Formula 1]

2 Claims, 5 Drawing Sheets

(51) Int. Cl.
*B22F 1/00* (2006.01)
*B82Y 30/00* (2011.01)

(52) U.S. Cl.
CPC ... *B22F 2301/255* (2013.01); *B22F 2304/054* (2013.01); *B22F 2304/056* (2013.01); *B22F 2998/10* (2013.01)

(58) Field of Classification Search
CPC .............. B23K 35/3605; B23K 35/361; B23K 35/3612; B23K 35/362; B23K 35/365; C22C 21/06

See application file for complete search history.

(56) References Cited

U.S. PATENT DOCUMENTS

| | | | |
|---|---|---|---|
| 2015/0079611 A1* | 3/2015 | Takanashi | G01N 33/582 435/7.23 |
| 2015/0224578 A1* | 8/2015 | Okamoto | B22F 9/30 252/514 |
| 2015/0225588 A1* | 8/2015 | Iguchi | B22F 9/24 106/31.92 |

FOREIGN PATENT DOCUMENTS

| | | | |
|---|---|---|---|
| JP | 2012031478 A | * | 2/2012 |
| WO | WO 2014/189024 A1 | | 11/2014 |
| WO | WO 2014/189025 A1 | | 11/2014 |

\* cited by examiner

METHOD FOR PRODUCING SILVER PARTICLES, AND SILVER PARTICLES PRODUCED BY THE METHOD

TECHNICAL FIELD

The present invention relates to a method for producing silver particles, specifically a method which is capable of producing silver particles having a moderate average particle size of 20 nm to 200 nm, i.e. producing silver particles of uniform particle size while controlling the size of the silver particles.

BACKGROUND ART

Silver (Ag) is a metal which is expected to be used in various industrial applications including electrode/wiring materials, binding materials/bonding materials, heat conduction materials, electrically conductive binding material/electrically conductive bonding materials, reflection coating materials, catalysts, and antibacterial materials because silver has excellent electrical conductivity and light reflectivity, and also specific properties such as a catalytic action and an antibacterial action. Use forms of silver in these various applications include dispersions/suspensions of silver particles in an appropriate solvent. For example, in formation of electrodes/wirings for wiring boards that are mounted on electronic components such as semiconductor devices, or in binding materials/bonding materials, electrically conductive binding materials/electrically conductive bonding materials and heat conduction materials, silver particles are formed into a paste, and the resulting metal paste is applied and fired to form a desired electrode, wiring, joint or pattern.

A liquid phase reduction method is generally known as a method for producing silver particles. In the method for producing silver particles by a liquid phase reduction method, a silver compound as a precursor is dissolved in a solvent, and a reducing agent is added to the solution to precipitate silver. At this time, a compound called a protective agent is generally added for inhibiting precipitated silver particles from aggregating to coarsen. The protective agent combines with reductively precipitated silver particles, and inhibits mutual contact of silver particles to prevent aggregation of silver particles.

A method for producing silver particles by a liquid phase reduction method can efficiently produce silver particles by adjusting the concentration of a silver compound in a solvent, and the type and added amount of a reducing agent, and properly selecting a protective agent. However, silver particles produced by the liquid phase reduction method tend to have a relatively large particle size, and have a wide particle size distribution due to the concentration gradient of reactants in a solvent. With silver particles having such a large particle size, electrodes and wirings with a size of several microns cannot be formed, and miniaturization of semiconductor devices etc. in recent years cannot be met. When silver particles having a wide particle size distribution are used, the film thickness tends to be uneven, and it is therefore difficult to use such silver particles in applications where smoothness is required.

As a method for producing silver particles, which replaces the liquid phase reduction method, a thermal decomposition method using a silver complex as a precursor is reported (Patent Document 1). This method basically makes use of the properties of a thermally decomposable silver compound such as silver oxalate ($Ag_2C_2O_4$), and includes forming a complex of a silver compound and an organic compound serving as a protective agent, and heating the complex as a precursor to prepare silver particles. In Patent Document 1, an amine is added to silver oxalate as a protective agent to form a silver-amine complex, and the complex is heated at a predetermined temperature and thermally decomposed to produce silver particles.

RELATED ART DOCUMENT

Patent Documents

Patent Document 1: JP 2010-265543 A

SUMMARY OF THE INVENTION

Problems to be Solved by the Invention

In the method including thermally decomposing a silver complex, extremely small silver fine particles of several nm can be produced with relatively uniform particle size. However, conversely, silver particles produced by this method are often difficult to use in some applications because the particle size is extremely small. For example, when the silver particles are used as a wiring material, a binding material/bonding material, an electrically conductive binding material/electrically conductive bonding material, or a heat conduction material, cracks are easily generated due to volumetric shrinkage during firing, so that breakage and delamination may occur.

As described above, the field of application of silver particles tends to widen, and thus not only very small silver fine particles of several nm, but also silver particles having a moderately small particle size of several tens to hundreds nm are necessary depending on an application. For meeting this requirement, a method for producing silver particles while controlling the silver particles with any particle size is necessary.

In this respect, the method for producing silver particles by the conventional thermal decomposition method is not satisfactory from the viewpoint of particle size adjustment. In the above-mentioned patent document, the physical properties of silver particles produced from an amine complex using silver oxalate as a silver compound are presented in detail, but these silver particles each have a particle size within the range of several nm to 20 nm, and it seems difficult to produce silver particles having a larger and moderate particle size.

The present invention provides a method for producing silver particles, capable of controlling the particle size to fall within the range of 20 nm to 200 nm in terms of an average particle size, and producing silver particles of uniform particle size.

Means for Solving the Problems

The present inventors first conducted studies based on a method for producing silver particles by a thermal decomposition method as a method for producing silver particles for solving the above problems. This is because the present inventors considered that the thermal decomposition method can adjust the particle size more reliably than a liquid phase reduction method, and produce silver particles of relatively uniform particle size as described above. The present inventors considered that the thermal decomposition properties of a silver compound as a raw material affect the resulting particular size of the silver particles. Here, in the thermal decomposition method in Patent Document 1, an example of producing silver particles using silver oxalate as a silver compound is reported. A complex generated from silver oxalate has the advantage that it is easily decomposed to generate metal silver, and releases carbon dioxide after decomposition, so that impurities do not remain.

While an amine complex generated from silver oxalate is easily thermally decomposed, this means that the nucleus generation rate in precipitation of silver particles is relatively high. Precipitation of silver particles proceeds with a combination of nucleus generation and nucleus growth due to decomposition of the complex at the peripheral part of the nucleus, and when the nucleus generation rate is high, the particle size of silver particles tends to be small. The cause for which silver particles produced by the conventional method are very small is a silver compound (silver oxalate) as a raw material, and for producing silver particles having a large particle size, a silver compound having decomposition properties appropriate to this purpose may be used. The present inventors studied the possibility of using silver carbonate ($Ag_2CO_3$) in place of silver oxalate as a raw material silver compound in the thermal decomposition method. This is because the present inventors considered that silver carbonate had a decomposition temperature slightly higher than silver oxalate, and accordingly silver particles having a relatively large particle size can be produced.

However, when silver carbonate is used as a silver compound as a raw material, silver particles are not necessarily smoothly precipitated from the silver carbonate. This takes the decomposition properties of silver carbonate into consideration, and in the decomposition process of silver carbonate, silver is not generated immediately from silver carbonate, but a two-stage decomposition phenomenon is clearly recognized in which silver oxide (AgO) is first generated, and silver is subsequently generated (see FIG. 6 described later). In production of silver particles by the thermal decomposition method, an amine complex generated from a silver compound is used as a precursor, and the amine complex showing a stepwise decomposition behavior is not preferable.

The present inventors studied a method for forming an amine complex, which can quickly generate silver particles by applying heat while using silver carbonate as a raw material compound. As a result, the present inventors found that by use of an amine complex obtained by reacting a limited range of amine compounds with silver carbonate, silver particles having a particle size in an intended range can be produced, thus arriving at the present invention.

The present invention provides a method for producing silver particles, including the steps of: mixing a thermally decomposable silver compound and an amine compound to prepare a silver-amine complex as a precursor; and heating the silver-amine complex to precipitate silver particles, the silver compound being silver carbonate, the amine compound being terminated with a primary amino group on at least one end, the amine compound being represented by the formula:

$H_2N$—R    [Chemical Formula 1]

wherein R represents a substituent satisfying the condition (1) or (2):

(1) hydrocarbon group with a carbon number of 5 or more and 10 or less, which has a linear structure, a branched structure or a cyclic structure, wherein R may, in part, contain oxygen, and R may, in part, contain a primary amino group, a secondary amino group or a tertiary amino group; and (2) hydrocarbon group with a carbon number of 4, which has a linear structure, wherein R may, in part, contain oxygen, and R may, in part, contain a primary amino group or a secondary amino group.

As described above, the present invention provides a method for producing silver particles using as a precursor an amine complex prepared by reacting a specific amine with silver carbonate used as a thermally decomposable silver compound as a raw material. The present invention includes the steps of: reacting silver carbonate with an amine to prepare a silver-amine complex; and heating the silver-amine complex to precipitate silver particles. Hereinafter, the constitutions of the present invention will be described in detail.

The silver carbonate as a raw material may be a commercial product, or may be prepared for carrying out the present invention. The silver carbonate is preferably one that is in a dry state (having a moisture content of 1% by mass or less). Silver carbonate is decomposed by light as well, and may partly contain silver oxide unless it is stored in a light shielding state. When silver carbonate having a low purity is used, the yield of silver particles may be deteriorated, and thus silver carbonate for use in the present invention is preferably one having a silver oxide content of 3% by mass or less.

The amine to be reacted with silver carbonate is an amine compound ($H_2N$—R) terminated with a primary amino group, where substituent R represents a hydrocarbon group with a carbon number of 5 or more, or a linear hydrocarbon group with a carbon number of 4. An amine to be reacted with silver carbonate based on the carbon number as described above is limited because when an amine with a carbon number 3 or less, or an amine with a carbon number of 4 but having a branched structure is used, the speed of the reaction with silver carbonate is so high that formation of a complex is localized, and thus a uniform complex cannot be obtained, and accordingly suitable silver particles cannot be generated. Further, the type of amine to one having a primary amino group as a terminal amino group is limited because when an amine compound composed only of a secondary amine or a tertiary amine is reacted, complex forming reaction is hard to proceed, so that unreacted part remains, and silver particles are not precipitated even when heat is applied.

Specific forms of amine compound that are preferable in the method in the present invention will be described more in detail. A preferable amine compound is one terminated with a primary amino group and containing a hydrocarbon group with a carbon number of 5 or more. This amine compound is preferable because reactivity with silver carbonate is in a proper range, and a complex is uniformly formed. The upper limit of the carbon number is 10 because when an amine with a large carbon number is used, a silver carbonate-amine complex is hard to be formed, so that silver particles are not generated.

The substituent in the amine compound with a carbon number of 5 or more is a hydrocarbon group having a linear structure, a branched structure or a cyclic structure, for example an alkyl group or aryl group with a carbon number of 5 or more. The substituent may contain oxygen on the backbone of the hydrocarbon group. For example, a part of the structural formula of the hydrocarbon group may contain a hydroxyl group, a methoxy group, an ethoxy group or the like. Specific examples include 3-ethoxypropylamine, hexylamine, benzylamine, octylamine, 2-ethylhexylamine, phenethylamine and 6-amino-1-hexanol.

One containing an amino group as the substituent R in the structural formula is also effective. The amino group contained in the hydrocarbon group may be any of a primary amino group, a secondary amino group and a tertiary amino group. Specific examples of the amine compound containing any of primary to tertiary amino groups in addition to the terminal primary amino group as described above include 3-dimethylaminopropylamine, 3-diethylaminopropylamine, methylimino-bis-propylamine, 3-(2-hydroxyethylamino) propylamine, 2-aminomethylpiperidine and imino-bis-propylamine.

As an amine compound applicable in the present invention, one having as a substituent a hydrocarbon group with a carbon number of 4, which has a linear structure is also useful. In this case, one with the hydrocarbon group having a branched structure is out of applicability. In an amine compound having a branched structure, the complex forming reaction is hard to proceed, so that silver particles cannot be obtained. The amine compound with a carbon number of 4 may contain oxygen on the backbone of the hydrocarbon group, and hence contain a hydroxyl group, a methoxy group, an ethoxy group or the like. The amine compound may contain an amino group (primary amino group or secondary amino group). Specific examples of the amine compound with a carbon number of 4 include butylamine, 3-methoxypropylamine, 1,4-diaminobutane, 4-aminobutanol and 3-methylaminopropylamine.

Thus, in the present invention, the range of amine compounds which can form an amine complex suitable for precipitation of silver particles by reacting with silver carbonate is defined. Each of the above-described amine compounds can singly form a complex with silver carbonate, and mixing a plurality of amine compounds is not necessary.

Preferably, the mixing ratio of silver carbonate and the amine compound is such that the ratio of the mol number of the amine compound to the mol number of silver in silver carbonate is 1.5 or more in terms of a molar amount. When this molar ratio is less than 1.5, an unreacted silver compound may remain, so that a sufficient amount of silver particles cannot be produced, and variation easily occurs in the particle size distribution of silver particles. On the other hand, the upper limit of the molar ratio (upper limit of the amount of amine) is not particularly specified, but since when the amount of amine is excessive, the purity of silver particles may be affected, this molar ratio is preferably 10 or less in terms of a molar amount.

In mixing of silver carbonate and the amine compound, a solvent may be used, but an amine complex can be generated without using a solvent. The complex can be formed at normal temperature and normal pressure. Preferably, after silver carbonate is mixed with the amine compound, the mixture is stirred so that a uniform reaction takes place.

After a reaction system including an amine complex is formed in the manner described above, the reaction system is heated to precipitate silver particles. Preferably, in this heating step, the reaction system is heated at a temperature elevation rate of 2.5 to 50° C./min until the reaction system reaches a set heating temperature. When the temperature elevation rate is excessively low, nucleus growth may precede nucleus generation to generate coarse silver particles. As described above, the complex can be formed at normal temperature, and temperature elevation is started preferably after formation of the complex.

The heating temperature in the heating step is set to a temperature equal to or higher than the decomposition temperature of the silver-amine complex. As described above, the decomposition temperature of the silver-amine complex varies depending on the type of amine coordinated to the silver compound, but the heating temperature is preferably 65 to 160° C. in consideration of the decomposition temperature of the amine complex generated from the amine compound to be used in the present invention. The heating temperature is especially preferably 100° C. to 160° C. In the heating step, after attainment of the above-mentioned heating temperature, the reaction system is heated and held for 10 minutes to 2 hours to precipitate silver particles.

The present invention is useful not only in that silver particles having a moderate particle size of 20 nm to 200 nm, which cannot be produced by the conventional method, can be produced by use of silver carbonate as a raw material, but also in that silver particles of uniform particle size can be produced while the particle size is adjusted to fall within this range. The particle size can be adjusted by adjusting the temperature elevation rate until attainment of the heating temperature, and silver particles having a smaller particle size can be produced as the heating rate is increased. For the silver particles having a particle size in a range intended by the present application, the temperature elevation rate of 2.5 to 50° C./min is suitable.

Silver particles are precipitated through the above heating step. In silver particles produced in this stage, a carbonate of the used amine may slightly remain as an impurity. It is considered that the amine carbonate is generated by reaction of carbonic acid and amine which are generated in decomposition of the silver-amine complex. When the silver particles contain amine carbonate, the amine carbonate may be decomposed to cause a variation in volume of the fired product at the time when the silver particles are formed into a paste etc., and applied and fired. Accordingly, the amine carbonate is preferably eliminated, and specifically, the content of the amine carbonate is preferably 5% by mass or less.

The amine carbonate can be easily removed by washing the produced silver particles. Preferably, the washing is performed by dissolving and removing the amine carbonate with an alcohol such as methanol. The content of the amine carbonate can be reduced by repeatedly performing the washing.

The silver particles produced in the above step can be stored and used in the form of an ink, paste or slurry with the silver particles dispersed in an appropriate solvent, or in the form of a dried powder.

Advantageous Effects of the Invention

As described above, the method for producing silver particles in the present invention is can easily control the particle size of silver particles generated. The silver particles generated at this time are particles of uniform particle size.

DESCRIPTION OF EMBODIMENT

First Embodiment

Figure 1:
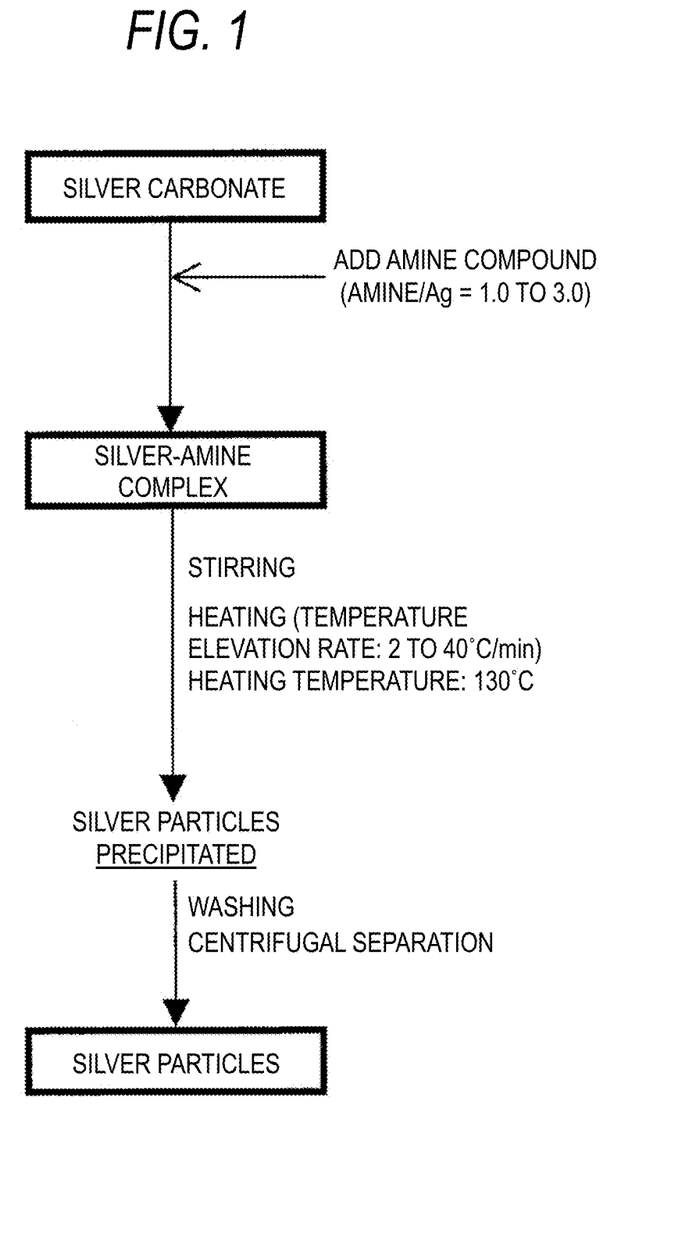
FIG. 1 illustrates a process for producing silver particles in Embodiment.

Hereinafter, a preferred embodiment of the present invention will be described. In this embodiment, silver particles were produced while various kinds of conditions were changed in accordance with the process in FIG. 1, and the properties of the silver particles were evaluated.

In this embodiment, 1.38 g of silver carbonate ($Ag_2CO_3$) (silver content: 10 mmol) was used as a silver compound as a raw material. As the silver carbonate, one dried by sufficiently removing moisture using a light-shielded drier was used.

Amine compounds used for formation of a silver-amine complex in this embodiment are as follows.

(a) Amine compound with the substituent R being a hydrocarbon group with a carbon number of 3 or more.

[Chemical Formula 2]

propylamine  butylamine
3-ethoxypropylamine  hexylamine
benzylamine  octylamine
2-ethylhexylamine
dodecylamine

[Chemical Formula 3]

isobutylamine  2-butylamine

(b) Amine compound with the substituent R being a hydrocarbon group with a carbon number of 3 or more, which contains an amino group in the structural formula.

[Chemical Formula 4]

3-(2-hydroxyethylamino)propylamine 3-dimethylaminopropylamine   3-diethylaminopropylamine methylimino-bis-aminopropylamine (c) Amine compound composed only of a secondary amine or a tertiary amine

[Chemical Formula 5]

dibutylamine   piperidine

N,N-dimethylbutylamine   γ-picoline

The amine compound was added in an amount of 10 mmol, 12 mmol, 15 mmol, 20 mmol and 30 mmol, i.e. a molar amount 1 times, 1.2 times, 1.5 times, 2 times and 3 times the molar amount of silver in silver carbonate. Amine compound was added at room temperature, and consequently, a cream-like silver amine complex was generated.

The amine complex was stirred for 10 to 30 minutes, and then heated to precipitate silver particles. In this heating step, the amine complex was heated to 130° C. from room temperature at a temperature elevation rate of 2, 5, 10, 20, 30 and 40° C./min, and after the temperature reached 130° C., the amine complex was kept at this temperature for 20 to 30 minutes, and then cooled at room temperature, methanol was added the reaction solution to perform washing, and the mixture was centrifugally separated. The washing and centrifugal separation were performed twice. Silver particles were obtained through the above operation.

The particle size (average particle size) and particle size distribution of the collected silver particles were evaluated. In this evaluation, the silver particles were observed with a SEM, and photographed, the particle sizes of (about 100 to 200) silver particles in the image were measured, and an average of the measured particle sizes was calculated. Further, as an index of relative variation in the particle size distribution, a variation coefficient (CV) was determined from the equation of "variation coefficient CV (%)=(standard deviation/average particle size)×100", and samples having a variation coefficient of 50% or less were rated "good: ○" while samples having a variation coefficient of more than 50% was rated "bad: x". Evaluation results for silver particles produced in this embodiment are shown in Table 1.

TABLE 1

| Test No. | Amine compound | | Carbon number of substituent | Production conditions | | Silver particle properties | |
|---|---|---|---|---|---|---|---|
| | | Name | | Amine/Ag mol | Temperature elevation rate °C./min | Average particle size nm | Particle size distribution |
| 1 | Chemical | Propylamine | 3 | 2 | 10 | 2000 | X |
| 2 | Formula 2 | Butylamine | 4 | 2 | 2 | 240 | X |
| 3 | | | | | 5 | 80 | ○ |
| 4 | | | | | 10 | 75 | ○ |
| 5 | | 3-Ethoxypropylamine | 5 | 2 | 10 | 70 | ○ |
| 6 | | Hexylamine | 6 | 1 | 10 | 185 | X |
| 7 | | | | 1.5 | 10 | 70 | ○ |
| 8 | | Benzylamine | 7 | 2 | 20 | 50 | ○ |
| 9 | | Octylamine | 8 | 2 | 5 | 40 | ○ |
| 10 | | | | 2 | 20 | 35 | ○ |
| 11 | | 2-Ethylhexylamine | | 2 | 10 | 85 | ○ |
| 12 | | | | 2 | 40 | 55 | ○ |
| 13 | | Dodecylamine | 12 | 2 | 10 | 15 | X |
| 14 | Chemical | 3-(2-Hydroxyethylamino)propylamine | 5 | 2 | 10 | 30 | ○ |
| 15 | Formula 4 | 3-Dimethylaminopropylamine | | 1 | 10 | 120 | X |
| 16 | | | | 1.2 | 10 | 90 | X |
| 17 | | | | 1.5 | 10 | 80 | ○ |
| 18 | | | | 3 | 10 | 75 | ○ |
| 19 | | 3-Diethylaminopropylamine | 7 | 2 | 10 | 90 | ○ |
| 20 | | | | 2 | 30 | 40 | ○ |
| 21 | | Methylimino-bis-propylamine | | 2 | 10 | 95 | ○ |
| 22 | Chemical | Isobutylamine | 4 | 2 | 10 | 155 | X |
| 23 | Formula 3 | 2-Butylamine | | 2 | 10 | 130 | X |
| 24 | Chemical | Dibutylamine | 8 | 2 | 10 | 1200*[1] | X |
| 25 | Formula 5 | Piperidine | 5 | 2 | 10 | 500*[1] | X |
| 26 | | N,N-Dimethylbutylamine | 6 | 2 | 10 | 2000*[1] | X |
| 27 | | γ-Picoline | 6 | 2 | 10 | 900*[1] | X |

*[1]Measurement is practically impossible because a large amount of unreacted substances exist.

It can be confirmed from Table 1 that by use of silver carbonate as a raw material, silver particles having a moderate particle size of 20 nm to 200 nm can be produced (No. 3 to No. 5, No. 7 to No. 12, No. 14 and No. 17 to No. 21). However, for producing suitable silver particles, the range of amine compounds for the silver-amine complex is limited to a certain range.

Specifically, when an amine compound with the substituent R being a hydrocarbon group with a carbon number of 5 or more and 10 or less, which is considered suitable in the present invention, is used, silver particles having an intended particle size and particle size distribution can be produced (No. 3 to No. 5, No. 7 to No. 12, No. 14 and No. 17 to No. 21). On the other hand, an amine compound with a carbon number of 3 (No. 1) and an amine compound with a carbon number of 12 (No. 13) cannot be employed because coarse silver particles are generated due to deficiency or excess of the number of carbons, or the complex forming reaction does not proceed, and thus silver particles are not obtained.

When the carbon number of the substituent R is 4, the possibility of production of silver particles depends on the structure of an amine compound. Silver particles having a suitable particle size and particle size distribution can be produced from an amine compound with the substituent having a linear structure (No. 3 and No. 4), whereas suitable silver particles cannot be produced from an amine compound having a branched structure (No. 22 and No. 23). Isobutylamine etc. has high reactivity, and causes formation of a silver amine complex and decomposition reaction at the same time immediately after being added, so that the reaction cannot be controlled, and thus the particle size distribution of silver particles is a very wide one including large particles of several microns. This does not meet the moderate particle size range of 20 nm to 200 nm.

Further, for an amine compound composed only of a secondary amine or tertiary amine when silver carbonate is used as a raw material, generation of a silver-amine complex is incomplete, so that generation of silver particles is impossible (No. 24 to No. 27). From the above considerations, it is apparent that for silver carbonate, a limited range of amine compounds are effective, but by appropriately using these amine compounds, suitable silver particles can be produced.

The amine compound may contain a hydroxyl group or a methoxy group in the substituent (No. 5 and No. 14). The amine compound may also contain a cyclic hydrocarbon (No. 8). Further, it is apparent that the amine compound may contain an amino group in the structural formula of the substituent, and the amino group in the substituent may be a secondary or tertiary amino group (No. 14 to No. 21).

Regarding production conditions, it is apparent that the mixed amount of an amine compound to be reacted with silver carbonate is 1.5 or more times the amount of silver in silver carbonate in terms of a molar amount (No. 6 and No. 15). When the temperature elevation rate in the heating step is about 2° C./min, silver particles become coarse, and therefore the temperature elevation rate is preferably higher than this (No. 2). For example, comparison between No. 9 and No. 10 shows that the particle size of silver particles can be adjusted by adjustment of the temperature elevation rate.

Figure 2:
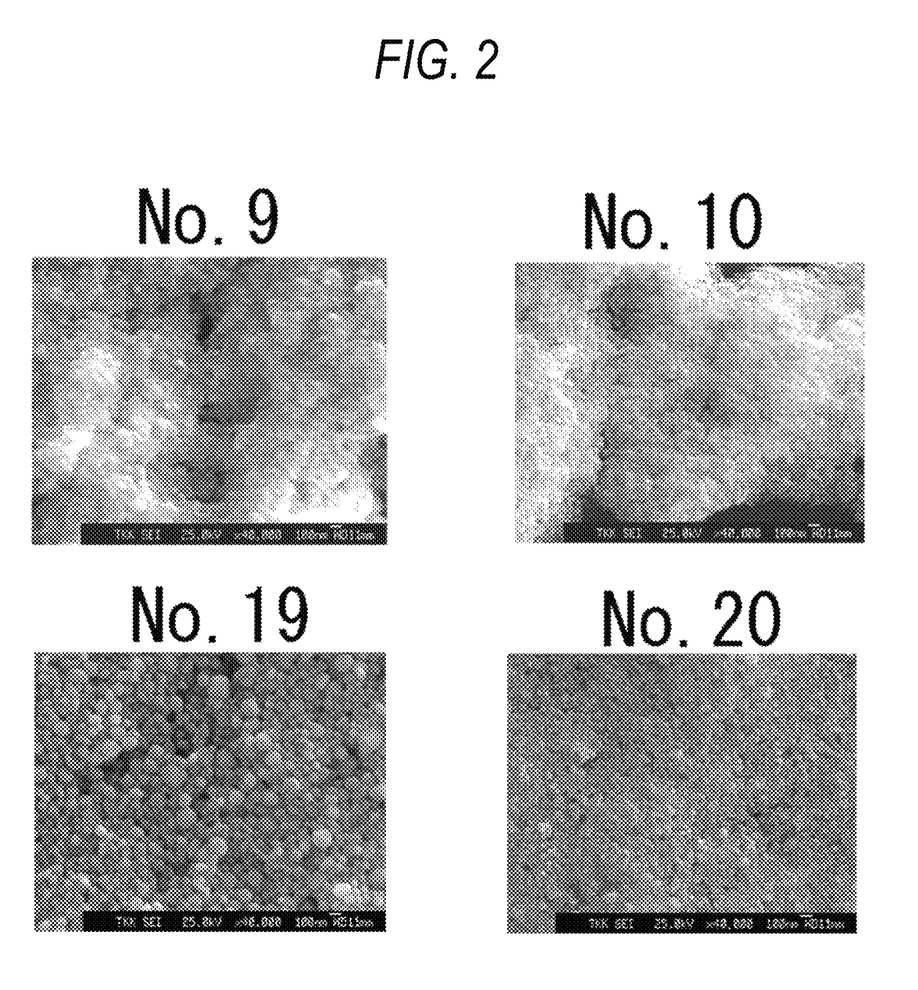
FIG. 2 shows SEM photographs of silver particles produced in No. 9, No. 10, No. 19 and No. 20 in Embodiment.
Figure 3:
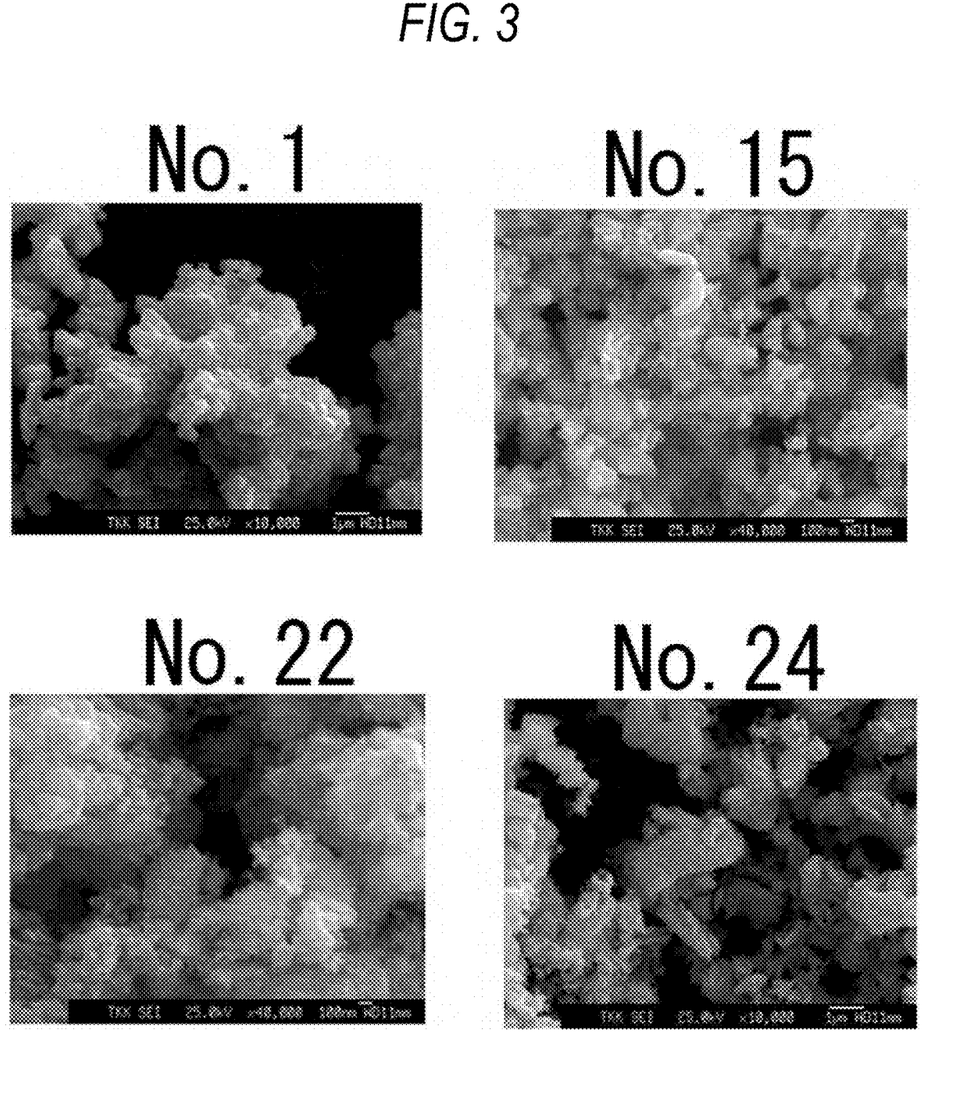
FIG. 3 shows SEM photographs of silver particles produced in No. 1, No. 15, No. 22 and No. 24 in Embodiment.
Figure 4:
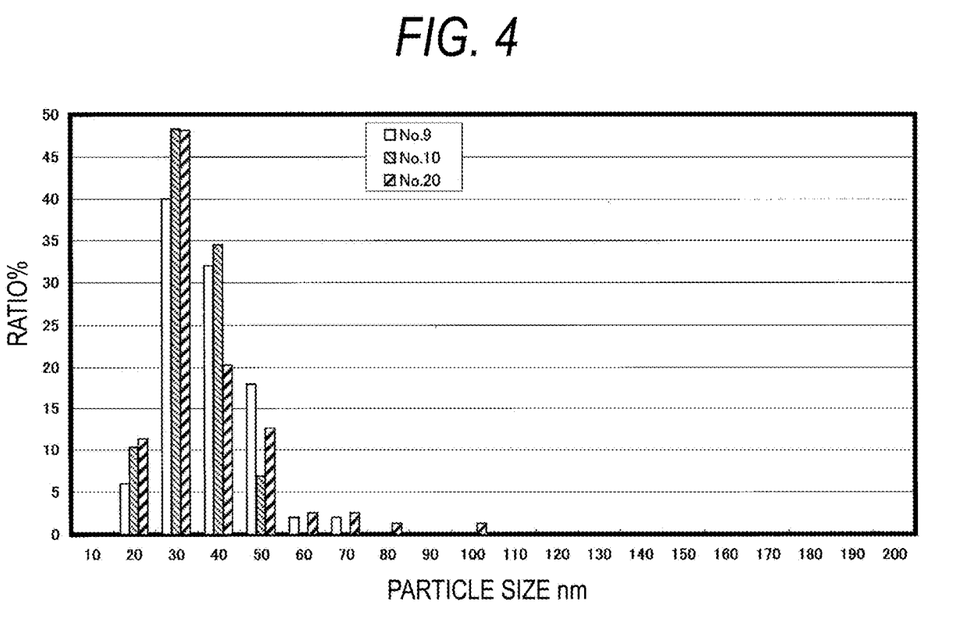
FIG. 4 illustrates a particle size distribution of silver particles in each of No. 9, no. 10 and No. 20 in the first embodiment.
Figure 5:
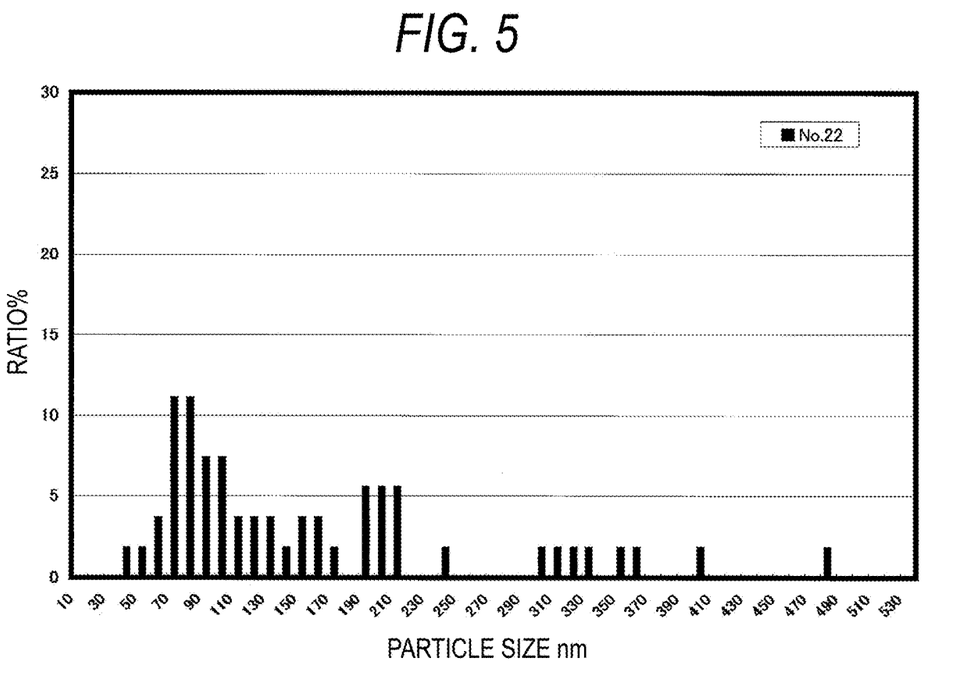
FIG. 5 illustrates a particle size distribution of silver particles in No. 22 in Embodiment t.

FIG. 2 shows SEM photographs of silver particles produced in No. 9, No. 10, No. 19 and No. 20 in this embodiment. FIG. 3 shows SEM photographs of silver particles produced in No. 1, No. 15, No. 22 and No. 24. Further, FIG. 4 illustrates a particle size distribution of silver particles in each of No. 9, No. 10 and No. 20, and FIG. 5 illustrates a particle size distribution of silver particles in No. 22. It can be confirmed that silver particles produced by use of a suitable amine compound such as that in No. 9 are particles of uniform particle size, and in No. 22, coarse silver particles of 300 nm or more are generated, and their particle size is not uniform.

Thus, it is confirmed that silver particles having a particle size in an intended range can be produced from an amine compound, the carbon number of which is limited. Here, for examining the thermal properties of silver carbonate as a raw material, a silver-amine complex and produced silver particles, TG-DTA analysis (thermogravimetric and differential thermal analysis) was performed for each sample.

Figure 6:
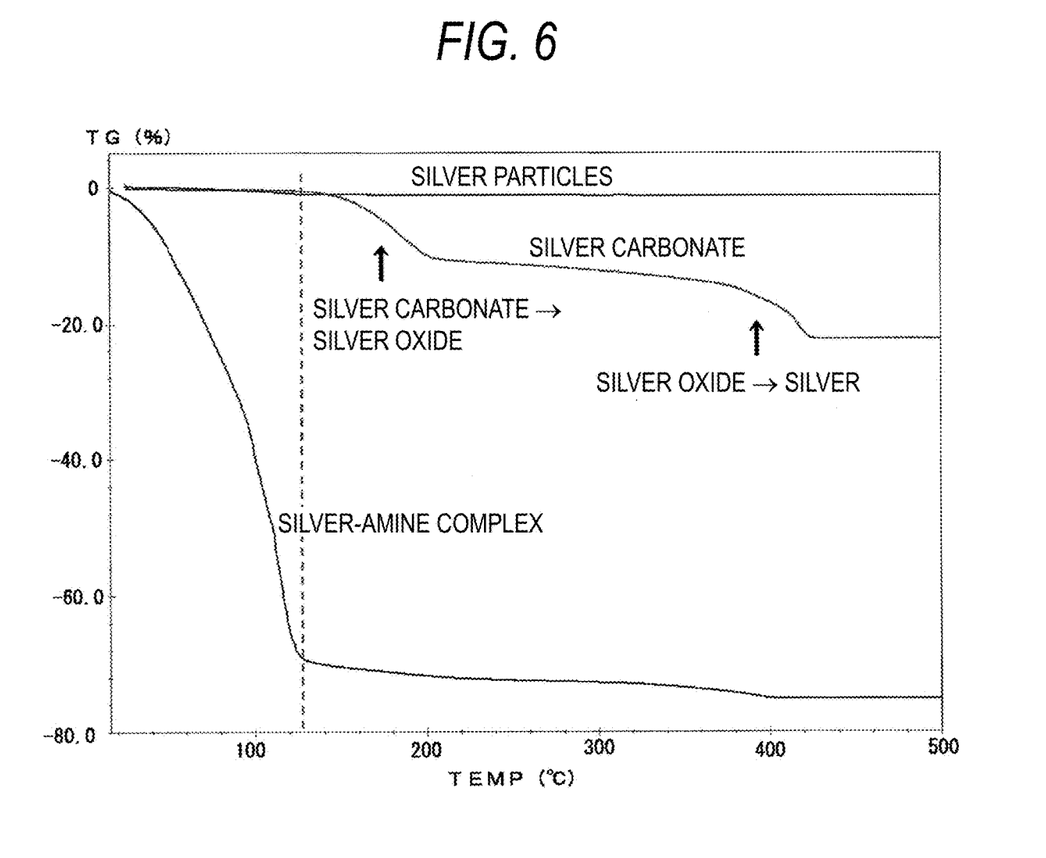
FIG. 6 illustrates results of TG-DTA analysis of silver carbonate.

FIG. 6 illustrates the results of TG-DTA analysis of silver carbonate, a silver-amine complex (No. 19) and silver particles. FIG. 6 shows that the silver carbonate as a raw material has a mass loss at a temperature in the vicinity of 200° C. and at a temperature in the vicinity of 400° C. These mass losses show a change from silver carbonate to silver oxide for the former, and a change from silver oxide to silver for the latter. As described above, silver carbonate shows a two-stage decomposition behavior. On the other hand, the amine complex starts decomposing at a temperature in the vicinity of 110° C., and changes into silver without showing a two-stage decomposition behavior as in silver carbonate. It can be said that the decomposition behavior was improved due to formation of a complex from an appropriate amine compound.

The TG curve for the amine complex shows that a slight mass loss occurs at a temperature exceeding 300° C. when heating is continued after the amine complex is decomposed into silver. This mass loss may result from decomposition of amine carbonate generated by reaction of carbonic acid and an amine which are generated by decomposition of the amine complex. In thermal decomposition of the silver-amine complex, a slight amount of amine carbonate is mixed in silver particles. However, it is considered that the amine complex was removed by washing silver particles after generating and collecting the silver particles. This can be confirmed from the TG curve for silver particles in FIG. 6 where there is no mass loss at a temperature of 300° C. or higher.

INDUSTRIAL APPLICABILITY

In the present invention, uniform silver particles can be produced while the particle size is controlled as described above. In the present invention, high-quality silver particles can be efficiently produced to be used in various industrial applications including electrode/wiring materials, binding materials/bonding materials, electrically conductive binding material/electrically conductive bonding materials, heat conduction materials, reflection coating materials, catalysts, and antibacterial materials.

The invention claimed is:

1. A method for producing silver particles, comprising the steps of:

mixing a thermally decomposable silver compound and an amine compound to produce a reaction system including a silver-amine complex as a precursor; and heating the silver-amine complex at a heating temperature equal to or higher than the decomposition temperature of the silver-amine complex to precipitate silver particles, wherein the silver particles have an average particle size of 70 to 200 nm and have a variation coefficient (CV) of the particle size of 50% or less as defined under Equation 1, $$\text{Variation coefficient } CV(\%) = (\text{standard deviation}/\text{average particle size}) \times 100 \quad \text{[Equation 1]}$$

wherein silver carbonate is used as the silver compound,
wherein the amine compound is represented by the Chemical Formula 1:

$$H_2N-R \quad \text{[Chemical Formula 1]}$$

wherein at least one end is a primary amino group, and
wherein R represents a substituent satisfying the condition (1) or (2):

(1) hydrocarbon group with a carbon number of not less than 5 and not more than 10, which has a linear structure, a branched structure or a cyclic structure, wherein R may, in part, contain oxygen, and R may, in part, contain a primary amino group, a secondary amino group or a tertiary amino group; and (2) hydrocarbon group with a carbon number of 4, which has a linear structure, wherein R may, in part, contain oxygen, and R may, in part, contain a primary amino group or a secondary amino group, and wherein the heating temperature is in the range of 65 to 160° C., and wherein the step of heating the silver-amine complex comprises heating the silver-amine complex at a temperature elevation rate of 2.5 to 50° C./minute until the reaction system reaches the heating temperature, and after the heating temperature is reached, the reaction system is heated and held to precipitate the silver particles.

2. The method for producing silver particles according to claim 1, wherein the amount of the amine compound mixed with the silver carbonate is 1.5 to 10 times the amount of silver in the silver carbonate in terms of a molar amount.

* * * * *